(12) United States Patent
Kang et al.

(10) Patent No.: US 8,374,869 B2
(45) Date of Patent: Feb. 12, 2013

(54) UTTERANCE VERIFICATION METHOD AND APPARATUS FOR ISOLATED WORD N-BEST RECOGNITION RESULT

(75) Inventors: Jeom Ja Kang, Daejeon (KR); Yunkeun Lee, Daejeon (KR); Jeon Gue Park, Daejeon (KR); Ho-Young Jung, Daejeon (KR); Hyung-Bae Jeon, Daejeon (KR); Hoon Chung, Daejeon (KR); Sung Joo Lee, Daejeon (KR); Euisok Chung, Daejeon (KR); Ji Hyun Wang, Daejeon (KR); Byung Ok Kang, Daejeon (KR); Ki-young Park, Daejeon (KR); Jong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 629 days.

(21) Appl. No.: 12/535,024

(22) Filed: Aug. 4, 2009

(65) Prior Publication Data

US 2010/0161334 A1 Jun. 24, 2010

(30) Foreign Application Priority Data

Dec. 22, 2008 (KR) ........................ 10-2008-0131755

(51) Int. Cl.
*G10L 15/04* (2006.01)
*G10L 15/28* (2006.01)
*G10L 15/14* (2006.01)
*G10L 15/00* (2006.01)
*G10L 15/26* (2006.01)
*G10L 15/06* (2006.01)
*G10L 17/00* (2006.01)

(52) U.S. Cl. ......... 704/251; 704/252; 704/253; 704/254; 704/255; 704/256.4; 704/231; 704/235; 704/233; 704/243; 704/246; 704/250; 704/256; 704/241; 704/245; 704/248

(58) Field of Classification Search .................. 704/233, 704/243, 251, 255, 256, 8, 252, 253, 254, 704/256.4, 231, 235, 246, 250, 241, 245, 704/248
See application file for complete search history.

(56) References Cited

U.S. PATENT DOCUMENTS
(Continued)

FOREIGN PATENT DOCUMENTS
KR 10-2000-0025827 5/2000
KR 10-2003-0082265 10/2003
(Continued)

OTHER PUBLICATIONS

Chi-Shi Liu; Hsiao-Chuan Wang; Lee, C.; , "Speaker verification using normalized log-likelihood score," Speech and Audio Processing, IEEE Transactions on , vol. 4, No. 1, pp. 56, Jan. 1996.*

*Primary Examiner* — Edgar Guerra-Erazo
(74) *Attorney, Agent, or Firm* — Staas & Halsey LLP

(57) ABSTRACT

An utterance verification method for an isolated word N-best speech recognition result includes: calculating log likelihoods of a context-dependent phoneme and an anti-phoneme model based on an N-best speech recognition result for an input utterance; measuring a confidence score of an N-best speech-recognized word using the log likelihoods; calculating distance between phonemes for the N-best speech-recognized word; comparing the confidence score with a threshold and the distance with a predetermined mean of distances; and accepting the N-best speech-recognized word when the compared results for the confidence score and the distance correspond to acceptance.

16 Claims, 4 Drawing Sheets

U.S. PATENT DOCUMENTS

| | | | |
|---|---|---|---|
| 5,315,689 A * | 5/1994 | Kanazawa et al. | 704/238 |
| 5,822,728 A * | 10/1998 | Applebaum et al. | 704/254 |
| 6,058,365 A * | 5/2000 | Nagai et al. | 704/257 |
| 6,064,958 A * | 5/2000 | Takahashi et al. | 704/243 |
| 6,125,345 A * | 9/2000 | Modi et al. | 704/240 |
| 6,223,155 B1 * | 4/2001 | Bayya | 704/243 |
| 6,460,017 B1 * | 10/2002 | Bub et al. | 704/256 |
| 6,539,353 B1 * | 3/2003 | Jiang et al. | 704/254 |
| 6,546,367 B2 * | 4/2003 | Otsuka | 704/260 |
| 6,571,210 B2 * | 5/2003 | Hon et al. | 704/251 |
| 6,615,170 B1 * | 9/2003 | Liu et al. | 704/233 |
| 7,761,296 B1 * | 7/2010 | Bakis et al. | 704/247 |
| 7,856,356 B2 * | 12/2010 | Chung et al. | 704/256 |
| 7,996,209 B2 * | 8/2011 | Jang et al. | 704/8 |
| 2001/0018654 A1 * | 8/2001 | Hon et al. | 704/257 |
| 2001/0049600 A1 | 12/2001 | Abrego et al. | |
| 2002/0107688 A1 * | 8/2002 | Otsuka | 704/231 |
| 2004/0162728 A1 * | 8/2004 | Thomson et al. | 704/255 |
| 2005/0080627 A1 * | 4/2005 | Hennebert et al. | 704/270 |
| 2006/0053014 A1 * | 3/2006 | Yoshizawa | 704/256.4 |
| 2006/0074664 A1 | 4/2006 | Lam et al. | |
| 2007/0083371 A1 | 4/2007 | Jeong et al. | |
| 2007/0124145 A1 * | 5/2007 | Luan et al. | 704/254 |
| 2008/0059185 A1 * | 3/2008 | Chung et al. | 704/256 |
| 2009/0271201 A1 * | 10/2009 | Yoshizawa | 704/255 |

FOREIGN PATENT DOCUMENTS

| | | |
|---|---|---|
| KR | 10-0664960 | 12/2006 |
| KR | 10-2007-0061266 | 6/2007 |

* cited by examiner

UTTERANCE VERIFICATION METHOD AND APPARATUS FOR ISOLATED WORD N-BEST RECOGNITION RESULT

CROSS-REFERENCE(S) TO RELATED APPLICATION(S)

The present invention claims priority of Korean Patent Application No. 10-2008-0131755, filed on Dec. 22, 2008, which is incorporated herein by reference.

FIELD OF THE INVENTION

The present invention relates to a speech recognition system; and, more particularly, to an utterance verification method and apparatus for providing isolated word N-best recognition results of high reliability in an isolated word speech recognition system.

BACKGROUND OF THE INVENTION

A speech recognition system outputs one or several results of speech recognition based on applications and recognition performance thereof. In general, a speech recognition system having excellent recognition performance uses a method of outputting single data having a likelihood with the highest distance with an input utterance. On the contrary, a speech recognition system having a poor recognition performance provides several output lists so that a user may select a correct answer.

As such, that a few output lists provided from several outputable lists are referred as N-best and the number of output lists is determined by specification and application of the system.

In an existing speech recognition system for providing N-best output lists, a user sees output results and determines whether the output result is a correct answer. That is, the existing system does not provide an utterance verification technique but entrusts a user to verify an utterance.

The N-best output lists are not provided as a vocabulary set similar to utterance data of the user and interaction relation between N-best output lists having no relations. On the other hand, the N-best output lists are provided as a vocabulary set similar to utterance data of the user and interaction relation between N-best output lists having relations.

The following Example 1 shows 10-best recognition results for a user's utterance "poongmin mok-yok-tang".

EXAMPLE 1

Answer: Poongmin mok-yok-tang
Recognition results: poongmin mokyoktang, munhyen mokyoktang, dongmoon mokyoktang, kwanmin mokyoktang, kwanmoon mokyoktang, bookmoon mokyoktang, tanhyen mokyoktang, yangmoon mokyoktang, younghyen mokyoktang, youngmoon mokyoktang. As shown in the above example, since the recognition results are very similar to the user's utterance, confusion in recognition of the speech recognition system is acceptable to the user.

The following Example 2 shows 10-best recognition results for a user's utterance "chungdahm villa".

EXAMPLE 2

Answer: chungdahm villa
Recognition results: hannahm club, chungdahm villa, yongdahm club, hwanggeum bra, handahm minbahk, gongahn joobang, dongahm drum, dongahempura, hannahm color, bohn computer However, as shown in the example 2, the recognition results have little relations there between as well as with the user utterance. Thus, the user may doubt the reliability of the speech recognition system.

SUMMARY OF THE INVENTION

In view of the above, the present invention provides an utterance verification method and apparatus for providing isolated word N-best recognition results of high reliability in an isolated word speech recognition system.

In accordance with one aspect of the present invention, there is provided an utterance verification method for an isolated word N-best speech recognition result, including:
 calculating log likelihood ratio of a context-dependent phoneme and an anti-phoneme model based on an N-best speech recognition result for an input utterance;
 measuring a confidence score of an N-best speech-recognized word using the log likelihoods ratio;
 calculating a distance between phonemes for the N-best speech-recognized word;
 comparing the confidence score with a threshold and the distance with a mean of distances; and
 accepting the N-best speech-recognized word when the compared results for the confidence score and the distance correspond to acceptance.

In accordance with one aspect of the present invention, there is provided an utterance verification apparatus for an isolated word N-best speech recognition result including:
 a pre-processor for extracting a feature vector of an input utterance and performing endpoint detection;
 an N-best speech recognizer for performing N-best speech recognition through Viterbi search by referring to the context-dependent phoneme model extracted from the feature vector; and
 an N-best utterance verification unit for calculating log likelihood ratio of a context-dependent phoneme and an anti-phoneme model for the N-best speech-recognized word, comparing a confidence score measured for the N-best speech-recognized word with a threshold, comparing a distance measured for the N-best speech-recognized-word with a mean of distances, and accepting the N-best speech-recognized word when the compared results for the confidence score and the distance correspond to acceptances.

BRIEF DESCRIPTION OF THE DRAWINGS

The above features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
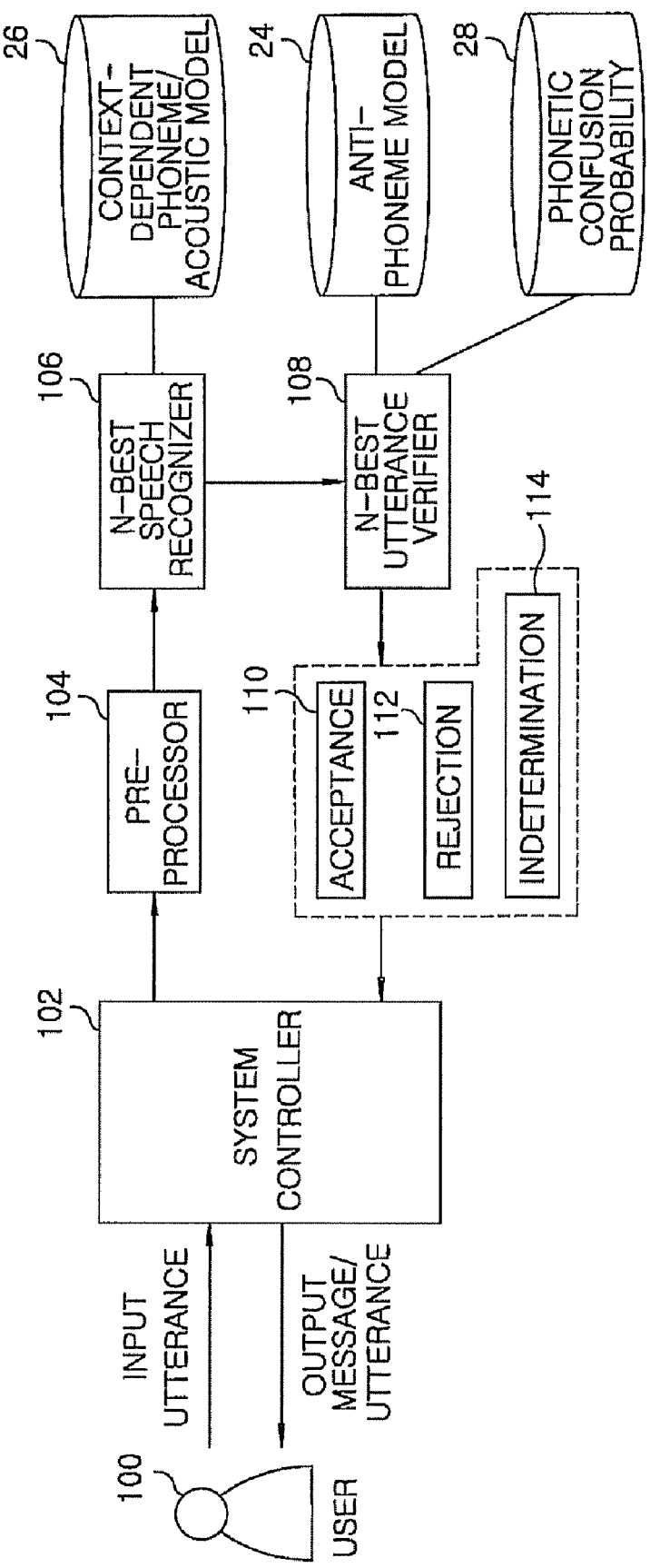
FIG. 1 shows configuration of a speech recognition system to which an utterance verification apparatus is applied in accordance with an embodiment of the present invention.

FIG. 1 shows configuration of a speech recognition system to which an utterance verification apparatus is applied in accordance with an embodiment of the present invention. The speech recognition system includes a system controller 102, a pre-processor 104, an N-best speech recognizer 106, and an N-best utterance verifier 108.

When a user 100 inputs his/her utterance using the speech recognition system having a speech recognition function, the system controller 102 receives the input utterance and delivers the same to the pre-processor 104. The pre-processor 104 performs an endpoint detection and feature extraction for processing noise and detecting speech interval to deliver the detected endpoint and the extracted features to the N-best speech recognizer 106. The N-best speech recognizer 106 performs N-best speech recognition through Viterbi search by referring to a context-dependent phoneme/acoustic model 26, and delivers the speech recognition results to the N-best utterance verifier 108.

Then, the N-best utterance verifier 108 measures confidence score for the speech recognition results, using an anti-phoneme model 24 and a phonetic confusion probability 28 obtained from trained phone data. That is, the N-best utterance verifier 108 measures the confidence score based on a log likelihood ratio (LLR) and uses a support vector machine (SVM) as a classifier. In order to measure a distance for the speech recognition results, the N-best utterance verifier 108 measures the distance based on dynamic time warping (DTW) and compares the measured distance with results from the classifier. Then, whether to accept 110 or reject 112 the speech recognition results is determined based on the comparison. If whether to accept or reject is unjudicable, indetermination 114 message is displayed to allow a user to determinate the acceptance 110 or the rejection 112.

Figure 2:
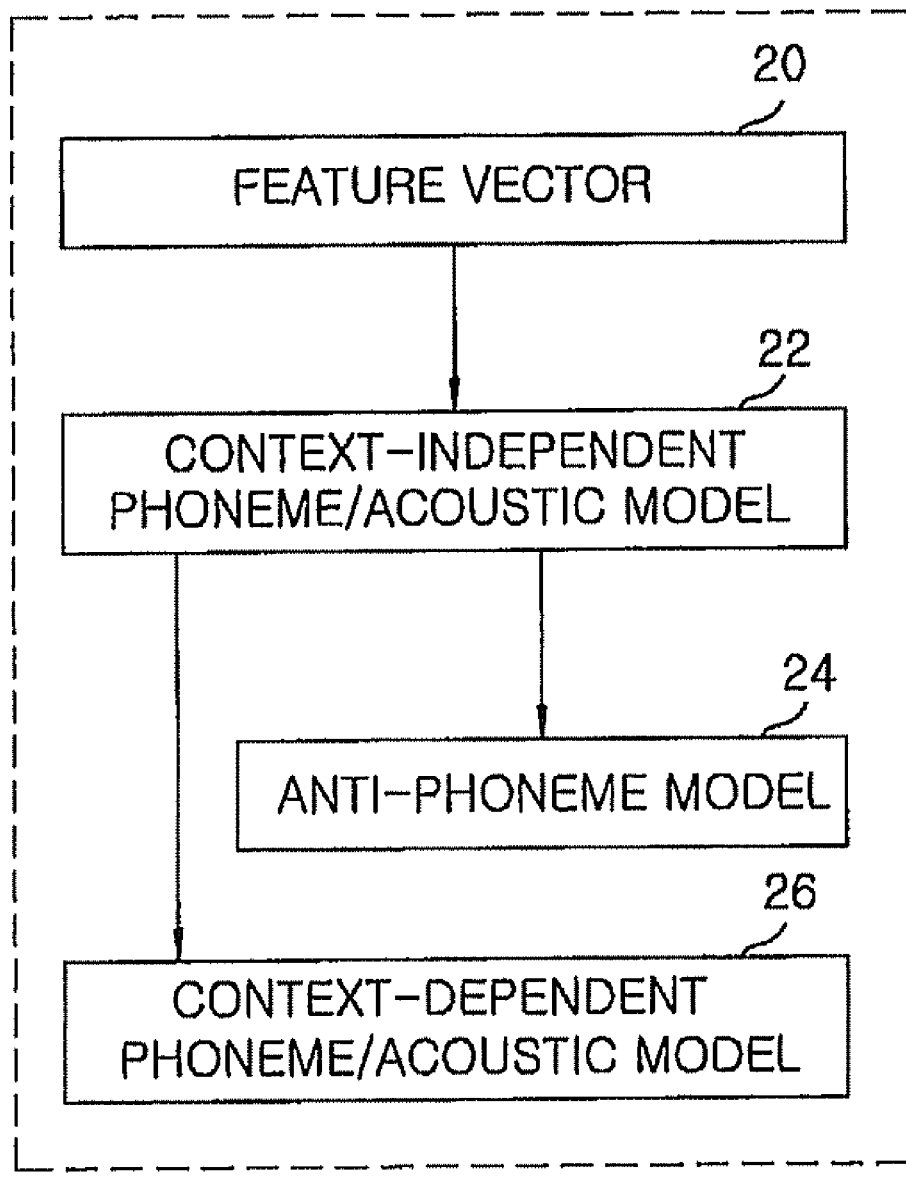
FIG. 2 illustrates a procedure of creating a model which is used to measure a confidence score of utterance verification in accordance with the present invention.

FIG. 2 illustrates a procedure of creating a model which is used to measure a confidence score of utterance verification in accordance with the present invention. A context-independent phoneme/acoustic model 22 is created using a feature vector 20 as an input and a context-dependent phoneme/acoustic model 26 is created. The context-independent phoneme/acoustic model 22 created during training is classified to create an anti-phoneme model 24, wherein the anti-phoneme model 24 is used for measurement of the confidence score. The context-dependent phoneme/acoustic model 26 is used by the N-best speech recognizer 106 shown in FIG. 1. The anti-phoneme model 24 is used by the N-best utterance verifier 108 shown in FIG. 1.

Figure 3A:
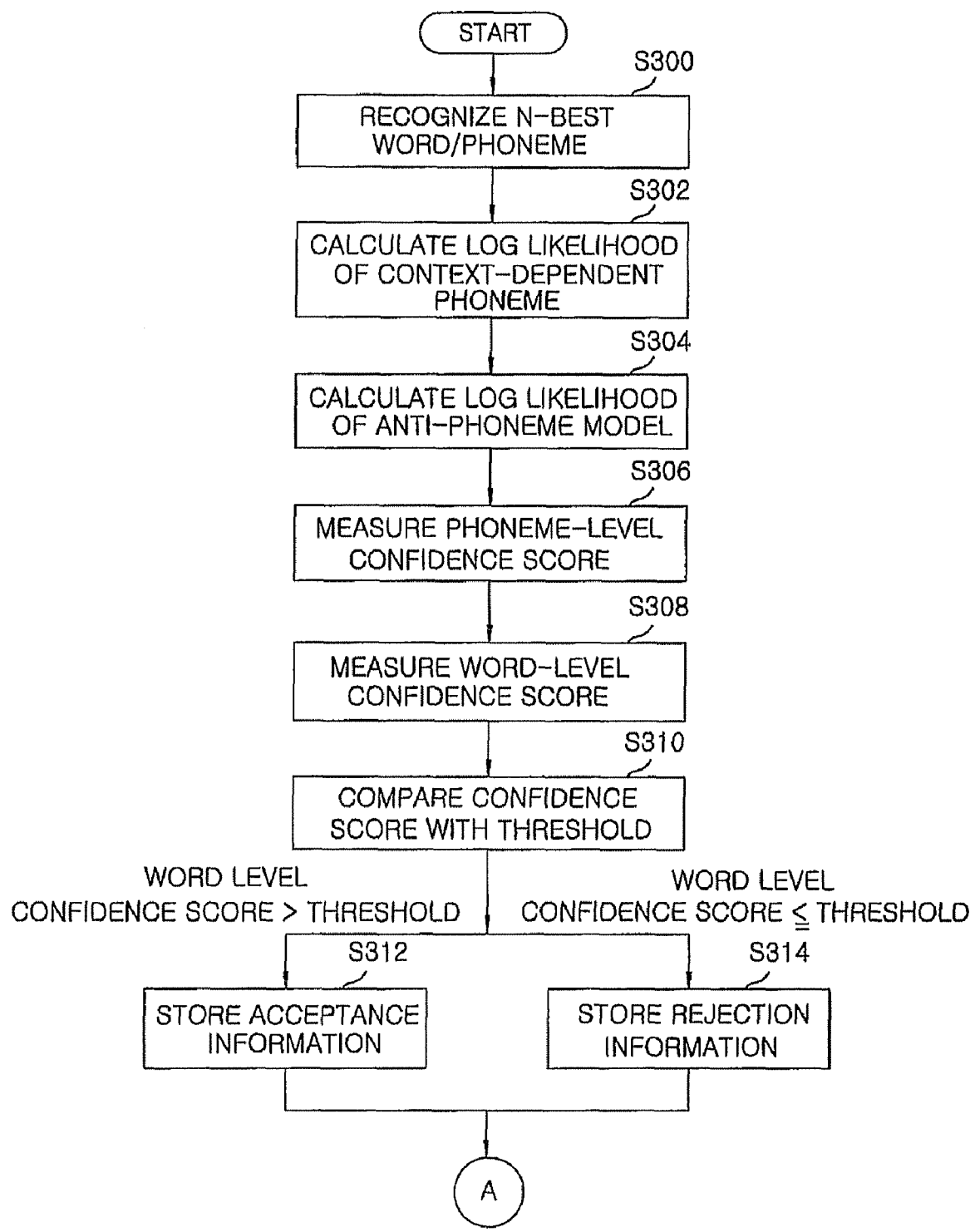
FIGS. 3A and 3B show a flowchart illustrating detailed process of utterance verification in accordance with the present invention.
Figure 3B:
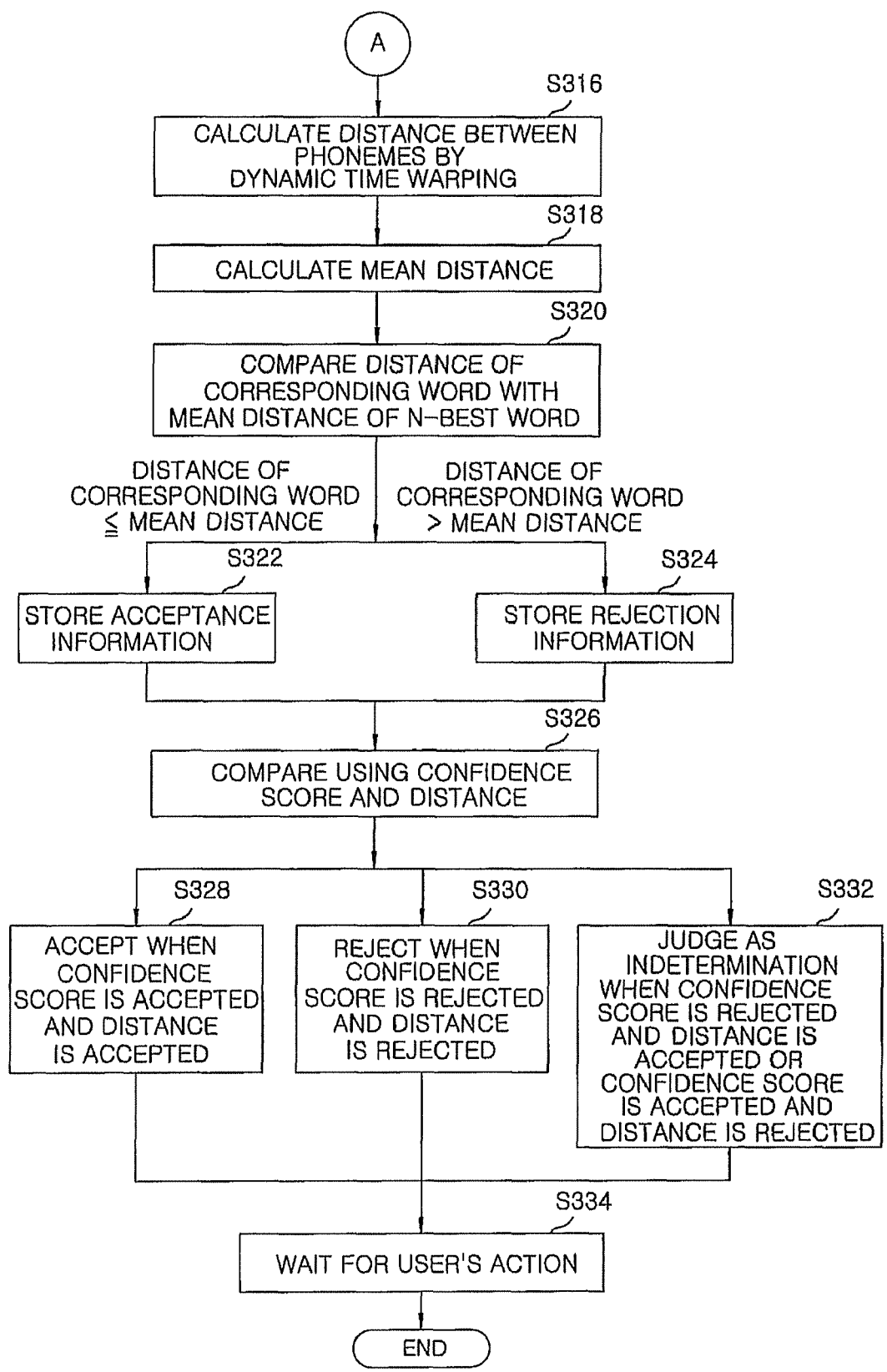

FIGS. 3A and 3B show a flowchart illustrating detailed process of utterance verification in accordance with the present invention.

An N-best word and phoneme recognition results from the N-best speech recognizer 106 of FIG. 1 are provided to the N-best utterance verifier 108 in step S300.

Next, the N-best utterance verifier 108 applies section information of the N-best word and the context-dependent phoneme/acoustic model 26, obtained from the model creating procedure shown in FIG. 2, to the N-best word, to calculate phoneme log likelihood composing the N-best word in step S302.

In this case, the log likelihood of the context-dependent phoneme is calculated from the following Equation 1.

log likelihood of context-dependent phoneme={(log likelihood of current phoneme)−(mean of base phonemes of current phoneme)}/(standard deviation of base phonemes of current phoneme)  [Equation 1]

That is, as seen in Equation 1, in order to calculate the log likelihood of the context-dependent phoneme, a mean value of base phonemes of current phoneme is subtracted from the log likelihood of a current phoneme and then is divided by a standard deviation of base phonemes of current phoneme.

Next, the N-best utterance verifier 108 calculates a log likelihood for the anti-phoneme model 24 using the anti-phoneme model 24 obtained from the procedure shown in FIG. 2 in step S304. In this case, the log likelihood for the anti-phoneme model 24 is calculated from the following Equation 2.

log likelihood of anti-phoneme model={(log likelihood of anti-phoneme model of current phoneme)−(mean of anti-phoneme model of current phoneme)}/(standard deviation of anti-phoneme model of current phoneme)  [Equation 2]

That is, as seen in Equation 2, in order to calculate the log likelihood of the anti-phoneme model of the current phoneme, a mean value of the anti-phoneme model of the current phoneme is subtracted from the log likelihood of the anti-phoneme model of the current phoneme and then is divided by a standard deviation of the anti-phoneme model of the current phoneme.

As such, when the calculation of the log likelihood of the context-dependent phoneme and the log likelihood of the anti-phoneme model is completed, the N-best utterance verifier 108 measures a phoneme-level confidence score in step S306.

Measuring the confidence score normalized by a frame length with respect to a phoneme i is expressed by Equation 3 and a sigmoid function of Equation 4 is used to restrict a range of the phoneme dynamic probability.

$$CM_i = \{(\text{log likelihood of context-dependent phoneme}) - (\text{log likelihood of anti-phoneme model})\}/T_i \quad \text{[Equation 3]}$$

$$CM_{i\text{-}Sigmoid} = \frac{1}{1 + \exp(-\alpha CM_i)} \quad \text{[Equation 4]}$$

That is, as known from the above Equations 3 and 4, the measurement of the phoneme-level confidence score is performed by subtracting the likelihood of the anti-phoneme model from the likelihood of the context-dependent phoneme, dividing it by the number of frames of a corresponding phoneme, and by taking a Sigmoid function thereof.

As such, when the phoneme-level confidence score is obtained, the N-best utterance verifier 108 measures a word-level confidence score in step S308.

In this case, the word-level confidence score is calculated by the following Equation 5.

Word-level confidence score={(log likelihood of the N-best speech-recognized word for the context-dependent phoneme model)−(log likelihood of the N-best speech-recognized word for the anti-phoneme model)}/(the number of phonemes in the N-best speech-recognized word)  [Equation 5]

As shown in Equation 5, the word level confidence score is calculated by subtracting the log likelihood of the anti-phoneme model word from the log likelihood of the context-dependent word and dividing the calculated value by the number of phonemes in the word.

The word-level confidence score is expressed by the following Equation 6.

$$CM_{am}(w) = \frac{1}{N}\left[\sum_{t=1}^{N} CM_{i\text{-}sigmoid}\right], \quad \text{[Equation 6]}$$

where N is the number of phonemes composing a word.

When the measurement of the word-level confidence score is completed, the N-best utterance verifier 108 sets a threshold by using a classifier or a specific confidence score, and compares the obtained confidence score with the threshold in step S310.

When the word-level confidence score is greater than the threshold, a true value is stored as an acceptance of a corresponding word in step S312. However, when the word level confidence score is less than the threshold, a false value is stored as a rejection in step S314. In this case, confidence score measuring parameters used as an input of the classifier are listed in the following table 1.

TABLE 1

| Confidence score measuring parameters | Description |
| --- | --- |
| NBestWordLLR | Sum of log likelihoods of N − 1 number of remaining words is subtracted from log likelihood of current Nth word |
| MulpyAllMixtureAntiAndNbestLLR | Multiplying LLR of anti-model by NbestWordLLR |
| WordGaussianDistProb | converting into Gaussian distribution using mean and standard deviation of phoneme duration probability |
| WordLikelihood | Word-level log likelihood |
| AllMixtureMeanOfAntiwordLLR | Measuring word-level confidence score by arithmetic mean without taking sigmoid function when obtaining phoneme level LLR |
| AllMixtureArithmeticAntiwordLLR | Measuring word-level confidence score by arithmetic mean |
| AllMixtureHarmonicAntiwordLLR | Measuring word-level confidence score by harmonic mean |
| AllMixtureGeometricAntiwordLLR | Measuring word-level confidence score by geometric mean |

That is, SVM training is performed using the confidence score measuring parameters in table 1, and the confidence score is compared with the threshold using the trained model.

Next, aside from storing a value determined by the classifier, the N-best utterance verifier 108 calculates distances between phonemes for the recognition results in step S316 and calculates mean of the distances as in the following Equation 6 in step S318.

$$\text{mean of distances} = \frac{\text{sum of distances of } N\text{-best recognition results}}{\text{the number of } N\text{-best}} \quad [\text{Equation 7}]$$

In order to calculate mean of distances by Equation 7, the phoneme confusion probability 28 is used as a cost to obtain distances of respective N-best recognition results, sum of the distances is obtained, and the sum of distances of the N-best recognition results is divided by the number of N-best.

Thereafter, the utterance verifier 108 compares a distance of a corresponding word with mean of N-best word distances in step S320. The N-best utterance verifier 108 stores acceptance information when the distance of the corresponding word is less than the mean distance in step S322, and stores rejection information when a distance of the corresponding word is greater than the mean distance in step S324.

Then, the N-best utterance verifier 108 combines the value determined by the classifier with a value determined by the distances for the comparison in step S326.

When the confidence score is accepted and the distance is also accepted, the corresponding speech-recognized word is accepted in step S328. When the confidence score is rejected and the distance is also rejected, the corresponding speech-recognized word is rejected in step S330. Alternately, when the confidence score is rejected and the distance is accepted or the confidence score is accepted and the distance is rejected, the corresponding speech-recognized word is regarded as indetermination in step S332 and the N-best utterance verifier 108 waits for a user's action in step S334

As described above, in the utterance verification method and apparatus for isolated word N-best speech recognition results, the confidence scores are measured through the N-best utterance verification for the N-best word-level speech recognition results, and distances between phonemes are measured based on dynamic time warping. Thereafter, acceptance/rejection or indetermination of speech recognition are displayed based on the confidence scores and the distances, thereby enabling speech recognition with high reliability.

While the invention has been shown and described with respect to the embodiments, it will be understood by those skilled in the art that various changes and modifications may be made without departing from the scope of the invention as defined in the following claims.

What is claimed is:

1. An utterance verification method for an isolated word N-best speech recognition result, comprising:
    calculating log likelihoods of a context-dependent phoneme and an anti-phoneme model based on an N-best speech recognition result for an input utterance;
    measuring a confidence score of an N-best speech-recognized word using the log likelihoods;
    calculating a distance between phonemes for the N-best speech-recognized word;
    comparing the confidence score with a threshold and the distance with a mean of distances; and
    accepting the N-best speech-recognized word when the compared results for the confidence score and the distance correspond to acceptance,
    wherein the log likelihood of the context-dependent phoneme is calculated by:

log likelihood of context-dependent phoneme={(log likelihood of current phoneme)−(mean of base phonemes of current phoneme)}/(standard deviation of base phonemes of current phoneme).

2. The utterance verification method of claim 1, wherein said comparing includes:
    accepting the N-best speech-recognized word when the confidence score is greater than the threshold;
    rejecting the N-best speech-recognized word when the confidence score is less than the threshold;
    accepting the N-best speech-recognized word when the distance is less than the mean of distances; and
    rejecting the N-best speech-recognized word when the distance is greater than the mean of distances.

3. The utterance verification method of claim 1, further comprising:
    rejecting the N-best speech-recognized word when the compared results for the confidence score and the distance correspond to rejections.

4. The utterance verification method of claim 1, further comprising:
   determining indetermination for the N-best speech-recognized word, when any one of the compared results for the confidence score and the distance corresponds to acceptance and the other corresponds to rejection.

5. The utterance verification method of claim 1,
   wherein the confidence score of the N-best speech-recognized word is calculated by:

word-level confidence score={(log likelihood of the N-best speech recognized word for the context-dependent phoneme model)−(log likelihood of the N-best speech recognized word for the anti-phoneme model word)}/(the number of phonemes in the N-best speech recognized word).

6. The utterance verification method of claim 5, wherein the mean of distances is calculated by:

mean of distances=(sum of distances of N-best recognition results)/the number of N-best.

7. The utterance verification method of claim 1, wherein the N-best speech recognition is performed by Viterbi search by referring to a context-dependent phoneme model extracted from a feature vector of the input utterance.

8. An utterance verification method for an isolated word N-best speech recognition result, comprising:
   calculating log likelihoods of a context-dependent phoneme and an anti-phoneme model based on an N-best speech recognition result for an input utterance;
   measuring a confidence score of an N-best speech-recognized word using the log likelihoods;
   calculating a distance between phonemes for the N-best speech-recognized word;
   comparing the confidence score with a threshold and the distance with a mean of distances; and
   accepting the N-best speech-recognized word when the compared results for the confidence score and the distance correspond to acceptance,
   wherein the log likelihood of the anti-phoneme model is calculated by:

log likelihood of anti-phoneme model={(log likelihood of anti-phoneme model of current phoneme)−(mean of anti-phoneme model of current phoneme)}/(standard deviation of anti-phoneme model of current phoneme).

9. An utterance verification system for an isolated word N-best speech recognition result comprising:
   a computer comprising:
   a pre-processor extracting a feature vector of an input utterance and performing endpoint detection;
   an N-best speech recognizer performing N-best speech recognition through Viterbi search by referring to the context-dependent phoneme model extracted from the feature vector; and
   an N-best utterance verifier calculating log likelihoods of a context-dependent phoneme and an anti-phoneme model for the N-best speech-recognized word, comparing a confidence score measured for the N-best speech-recognized word with a threshold, comparing a distance measured for the N-best speech-recognized-word with a mean of distances, and accepting the N-best speech-recognized word when the compared results for the confidence score and the distance correspond to acceptances wherein the likelihood of the context-dependent phonemes is calculated by:

log likelihood of context-dependent phoneme={(log likelihood of current phoneme)−(mean of base phonemes of current phoneme)}/(standard deviation of base phonemes of current phoneme).

10. The utterance verification apparatus of claim 9, wherein the N-best utterance verifier accepts the N-best speech-recognized word when the confidence score is greater than the threshold, and rejects the N-best speech-recognized words when the confidence score is less than the threshold.

11. The utterance verification apparatus of claim 9, wherein the N-best utterance verifier accepts the N-best speech-recognized words when the distance is less than the mean of distances, and rejects the N-best speech-recognized words when the distance is greater than the mean of distances.

12. The utterance verification apparatus of claim 9, wherein the N-best utterance verifier rejects the N-best speech-recognized word, when the compared results for the confidence score and the distance correspond to rejections.

13. The utterance verification apparatus of claim 12, wherein the N-best utterance verifier determines indetermination for the N-best speech-recognized word, when any one of the compared results for the confidence score and the distance corresponds to acceptance and the other corresponds to rejection.

14. The utterance verification apparatus of claim 9, wherein the confidence score of the N-best speech-recognized word is calculated by:

word-level confidence score={(log likelihood of context-dependent word)−(log likelihood of anti-phoneme model word)}/(the number of phonemes in word).

15. The utterance verification apparatus of claim 9, wherein the mean of distances is calculated by:

mean of distances=(sum of distances of N-best recognition results)/the number of N-best.

16. An utterance verification system for an isolated word N-best speech recognition result comprising:
   a computer comprising:
   a pre-processor extracting a feature vector of an input utterance and performing endpoint detection;
   an N-best speech recognizer performing N-best speech recognition through Viterbi search by referring to the context-dependent phoneme model extracted from the feature vector; and
   an N-best utterance verifier calculating log likelihoods of a context-dependent phoneme and an anti-phoneme model for the N-best speech-recognized word, comparing a confidence score measured for the N-best speech-recognized word with a threshold, comparing a distance measured for the N-best speech-recognized-word with a mean of distances, and accepting the N-best speech-recognized word when the compared results for the confidence score and the distance correspond to acceptances
   wherein the likelihood of the anti-phoneme model is calculated by:

likelihood of anti-phoneme model={(log likelihood of anti-phoneme model of current phoneme)−(mean of anti-phoneme model of current phoneme)}/(standard deviation of anti-phoneme model of current phoneme).

* * * * *